United States Patent
Clow et al.

(10) Patent No.: US 7,386,803 B2
(45) Date of Patent: Jun. 10, 2008

(54) METHOD AND APPARATUS FOR MANAGING INPUT FOCUS AND Z-ORDER

(75) Inventors: Joshua Clow, Bellevue, WA (US); Adrian Garside, Sammamish, WA (US); Shiraz Somji, Kenmore, WA (US); Donald D. Karlov, Woodinville, WA (US); Bob Dain, Redmond, WA (US); Jeffrey W. Pettiross, Seattle, WA (US); Tobiasz A. Zielinski, Redmond, WA (US); Alexander Gournares, Kirkland, WA (US); Leroy B. Keely, Portola Valley, CA (US); Ravi Soin, Bellevue, WA (US); Erik Geidl, Bellevue, WA (US); Marieke Iwema, Seattle, WA (US); Grady Leno, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 11/034,749

(22) Filed: Jan. 14, 2005

(65) Prior Publication Data
US 2005/0125741 A1    Jun. 9, 2005

Related U.S. Application Data

(63) Continuation of application No. 10/141,916, filed on May 10, 2002, now Pat. No. 6,928,619.

(51) Int. Cl.
*G06F 17/00* (2006.01)
(52) U.S. Cl. .................. 715/767; 715/768; 715/802; 715/794
(58) Field of Classification Search ........ 715/764–770, 715/802–809, 794–797
See application file for complete search history.

(56) References Cited

U.S. PATENT DOCUMENTS

| 5,307,086 | A | * | 4/1994 | Griffin et al. ............... 715/808 |
| 5,754,174 | A | | 5/1998 | Carpenter et al. |
| 6,359,572 | B1 | | 3/2002 | Vale |
| 6,552,719 | B2 | | 4/2003 | Lui et al. |

(Continued)

OTHER PUBLICATIONS

I. Scott Mackenzie, Blair Nonnecke and Stan Riddersma, "Alphanumeric Entry on Pen-Based Computers", article, 1994, pp. 775-792, vol. 41, Ontaio Canada, International Journal of Human-Computer Studies.

(Continued)

*Primary Examiner*—Tadesse Hailu
(74) *Attorney, Agent, or Firm*—Birch, Stewart, Kolasch & Birch, LLP

(57) ABSTRACT

An improved system for managing user inputs and z-order in a graphic user interface (GUI) environment is disclosed. A GUI element may include a plurality of keys corresponding to keys on a typical keyboard, and may serve as a replacement for the keyboard. The system permits an application having an input focus to retain the input focus while inputs are received in the GUI element, and even transient user interface elements (e.g., menus) will remain displayed in those applications after the user inputs are entered. Input pen and mouse events may first be forwarded to the input area application, which may remove the events from the normal circulation, preventing other applications from learning of the events, and then post those events to the input panel application separately.

19 Claims, 9 Drawing Sheets

U.S. PATENT DOCUMENTS

| | | |
|---|---|---|
| 6,741,267 B1 | 5/2004 | Leperen |
| 6,788,815 B2 | 9/2004 | Lui et al. |
| 2003/0074647 A1* | 4/2003 | Andrew .................. 717/100 |
| 2004/0155869 A1 | 8/2004 | Robinson et al. |

OTHER PUBLICATIONS

I. Scott Mackenzie, R. Blair Nonnecke, J. Craig Mcqueen, Stan Riddersma, and Malcolm Meltz, "A Comparison of Three Methods of Character Entry on Pen-Based Computers", article, 1994, pp. 330-334, Proceedings of the Human Factors and Ergonomics Society 38th Annual Meeting.

Laurie L. Quill and David W. Biers, "On-Screen Keyboards: Which Arrangements Should Be Used?", article, 1993, pp. 1142-1146, Proceedings of the Human Factors and Ergonomics Society 37th Annual Meeting.

Jeffrey C. Schlimmer and Patricia Crane Wells, "Quantitative Results Comparing Three Intelligent Interfaces for Information Capture: A Case Study Adding Name Information Into an Electronic Personal Organizer", article, Dec. 1996, pp. 329-349, vol. 5, Journal of Artificial Intelligence Research.

Andrew Sears, Julie A. Jacko, Josey Chu and Fransisco Moro, "The Role of Visual Search in the Design of Effective Soft Keyboards", article, 2001, pp. 159-166, vol. 20, No. 3, Behaviour & Information Techology.

Geoff Cumming, "Qwerty and Keyboard Reform: The Soft Keyboard Option", article, 1984, pp. 445-450, vol. 21, Int. J. Man-Machine Studies.

R. William Soukoreff and I. Scott Mackenzie, "Theoretical Upper and Lower Bounds on Typing Speed Using a Stylus and a Soft Keyboard", article, 1995, pp. 370-379, vol. 14, No. 6, Behaviour & Information Technology.

I. Scott Mackenzie and Shawn X. Zhang, "An Empirical Investigation of the Novice Experience With Soft Keyboards", article, 2001, pp. 411-418, vol. 20, No. 6, Behaviour & Information Technology.

* cited by examiner

METHOD AND APPARATUS FOR MANAGING INPUT FOCUS AND Z-ORDER

The present application is a continuation of application Ser. No. 10/141,916, entitled "Method and Apparatus for Managing Input Focus and Z-Order," filed on May 10, 2002, the specification of which is incorporated by reference.

FIELD OF THE INVENTION

The present invention relates generally to graphical user interfaces. Specifically, aspects of the present invention relate to providing a user input panel that may be used to provide input, such as textual input, to a targeted application operating on a computer system. In further aspects, an input focus of the computer system may remain with the target application while the input is received at the user input panel.

BACKGROUND OF THE INVENTION

Human beings are visual creatures by nature, and it should come as no surprise that the graphical user interface (GUI) has become the preferred method through which users have chosen to interact with their computers. Current GUIs, such as those in the MICROSOFT WINDOWS™ line of products, display a number of graphical panels, often referred to as "windows," through which users may interact with various computer applications.

To illustrate, FIG. 7a depicts an example GUI in which a display area 701 contains a number of graphical panels 702a, b, that represent two applications operating on the system. These applications may be, for example, a word processing program 702a (for example, MICROSOFT WORD™) and a drawing creation program (for example, MICROSOFT VISIO™) 702b. The various panels 702 are overlaid atop one another (if they overlap one another), in what is often referred to as the "z-order" of panels (the hierarchy of panels that determines which panel is on top when two or more panels overlap), where the topmost panel in the z-order receives the so-called "input focus." This input focus identifies the application whose panel is currently being used by the user, and helps the computer operating system identify the application that should receive certain inputs to the system. For example, if the user presses keys on a keyboard, the input focus identifies the application that will receive and process those key presses.

The system assigns the input focus according to the user's commands. For example, the GUI often includes an onscreen pointer 703, which may be moved about the display area 701 by the user with an input device, such as a trackball or mouse (not shown). By positioning the pointer 703 over a particular panel 702b, and pressing or "clicking" the left mouse button, the user can determine which panel is to receive the input focus. In FIG. 7b, panel 702a currently has the input focus, and is at the top of the z-order (it appears above other panels). The user has positioned the pointer 703 over panel 702b, and after pressing the designated key (e.g., entering a mouse click), panel 702b is given the input focus and is brought to the foreground, resulting in the display shown in FIG. 7c. Subsequently, user inputs to the computer's keyboard will be forwarded to the application corresponding to panel 702b, as opposed to panel 702a.

The mouse click that selects panel 702b is also reported by the operating system to the application corresponding to panel 702a, which in turn prepares to lose the input focus. In preparing to lose input focus, the application corresponding to panel 702a prepares to be placed in the background, and closes any "transient" user interface (UI) elements, such as menus.

While the existing GUI described generally above is suitable for users of many typical personal computers, a new generation of computing devices has introduced a unique perspective, and problem. The computers in this new generation can be operated without the traditional keyboard and/or mouse to which we have become accustomed. Examples include the tablet, or pen-based, line of computer products introduced by Microsoft Corp.

Since these pen-based computing devices may not always include a separate keyboard, alternative approaches to providing user inputs will be needed. However, existing options for providing user inputs, without a keyboard, are not fully adequate. One existing option is the Accessibility Keyboard offered by the MICROSOFT WINDOWS™ operating system. The Accessibility Keyboard appears as a panel resembling the traditional keyboard with the "qwerty" arrangement of character keys. After opening the Accessibility Keyboard, the user is prompted to select the application panel that is to have the input focus (by "mouse-clicking" on it), and subsequent selections of the displayed character keys on the Accessibility Keyboard will cause the selected characters to be sent to the designated application panel.

The Accessibility Keyboard is not, however, a complete replacement for the keyboard. For example, mouse clicking on a key in the Accessibility Keyboard causes transient UI elements (e.g., menus) in other application panels to close. This occurs because the Accessibility Keyboard is implemented as if it were another application panel, and is treated as such. Accordingly, keyboard interaction with such transient UI elements (e.g., selecting a menu item by pressing a key) is not possible using the Accessibility Keyboard (e.g., the menus disappear, rather than respond to the character). Accordingly, there is a need for an improved approach to managing user inputs and z-ordering of application panels.

SUMMARY OF THE INVENTION

In some embodiments of the present invention, a separate GUI input panel is used as an input device for providing user inputs to other GUI application panels on the computer display. One embodiment of such a separate GUI input panel is a text or alphanumeric input panel resembling, and replacing, the hardware keyboard that is traditionally associated with computers. The input panel is not limited to text, nor does it necessarily include text, and can in fact receive other inputs such as speech, electronic ink and gestures from an electronic stylus, pen, mouse, or other input device.

Aspects of some embodiments of the present invention allow application panels to retain the input focus, even while the user enters data in the input panel.

In some embodiments, the input panel receives mouse and/or pen inputs before those inputs are supplied to other applications in the computer system. In further embodiments, the input panel determines whether the mouse and/or pen inputs should be forwarded to the other applications in the system.

In further embodiments, the input panel is configured to avoid receiving the input focus of the computer system.

In some embodiments, a separate application receives inputs from a stylus or pen, and determines whether the inputs are within the input panel. In further embodiments, a separate application registers with the underlying operating system to receive mouse inputs prior to other applications.

In further embodiments, the input panel is accompanied by a preview area. In further embodiments, the preview area displays textual data entered by the user, but before the textual data is forwarded to a designated application, to allow the user to verify the accuracy of the data before it is forwarded. In some embodiments, the preview area is permitted to obtain the input focus of the system, to allow editing of the displayed data before it is forwarded.

In some embodiments, the preview area is implemented as a separate application from the input panel, and communicates with the input panel.

According to some embodiments, the input area and/or preview area is/are placed above other applications in the z-order of the system.

DETAILED DESCRIPTION OF THE PREFERRED EMBODIMENTS

I. Example Hardware

Figure 1:
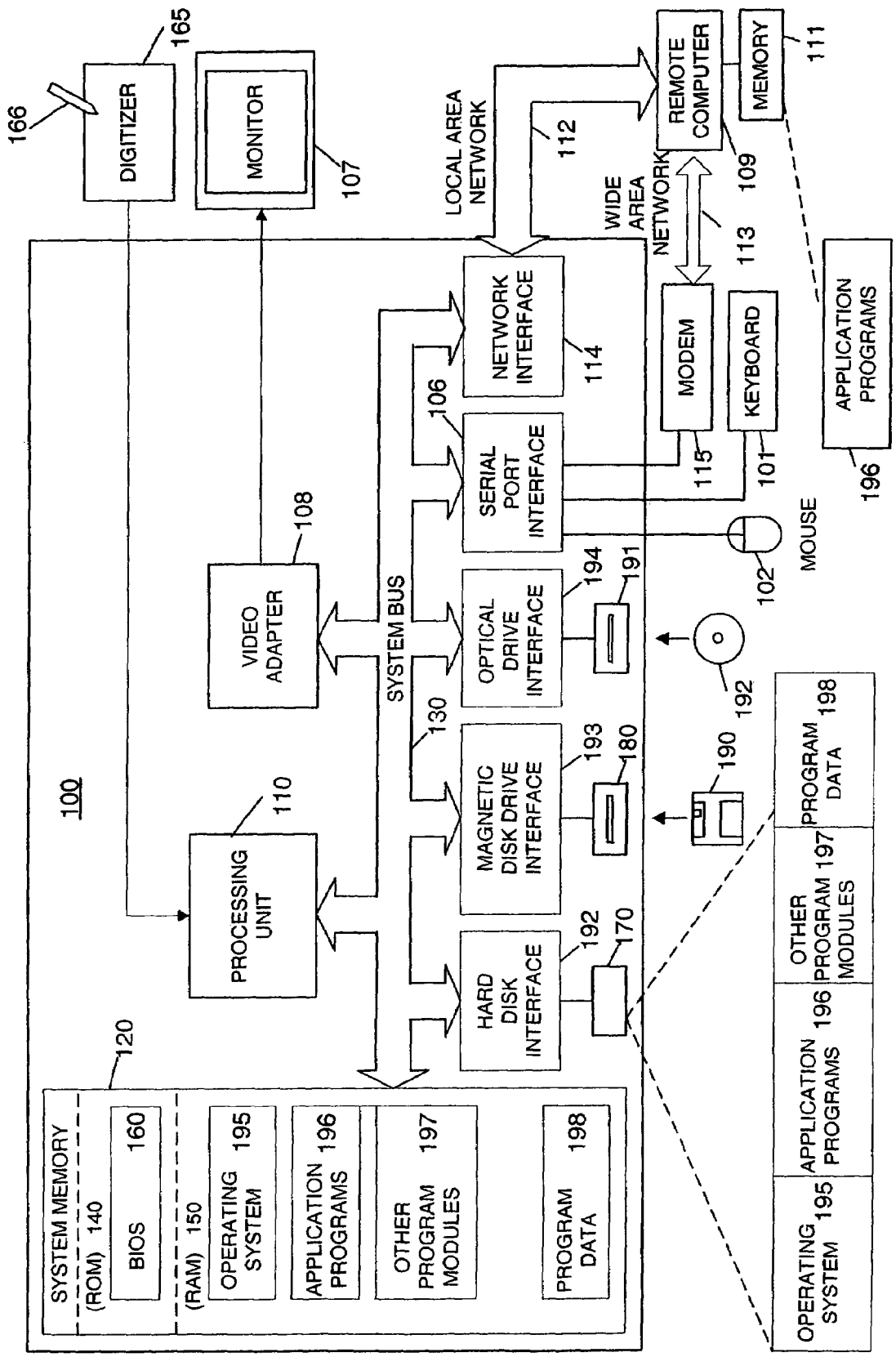
FIG. 1 shows a schematic diagram of an example conventional general-purpose digital computing environment in which one or more embodiments of the present invention may be implemented.

The present invention may be more readily described with reference to FIGS. 1-6*b*. FIG. 1 illustrates a schematic diagram of an example conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include the user's finger, a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an example environment, it will be understood that other computing environments may also be used. For example, one or more embodiments of the present invention may use an environment having fewer or more than all of the various elements shown in FIG. 1 and described above, and these elements may appear in various combinations and subcombinations that will be apparent to one of ordinary skill.

Figure 2:
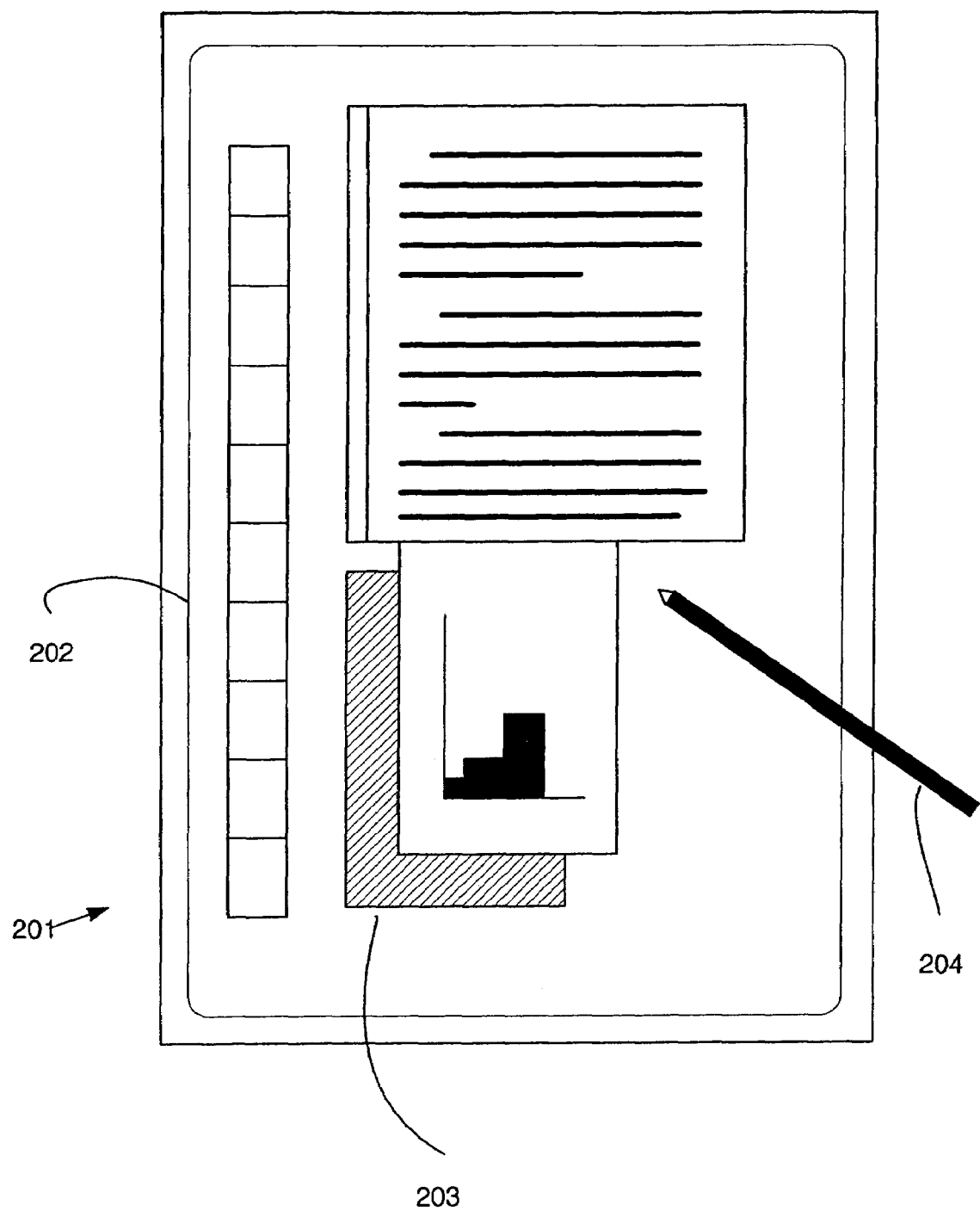
FIG. 2 shows an example tablet personal computing (PC) environment in which one or more embodiments of the present invention may be implemented.

FIG. 2 illustrates a tablet personal computer (PC) 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus (or "pen") 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

II. Example GUI Elements

Figure 3:
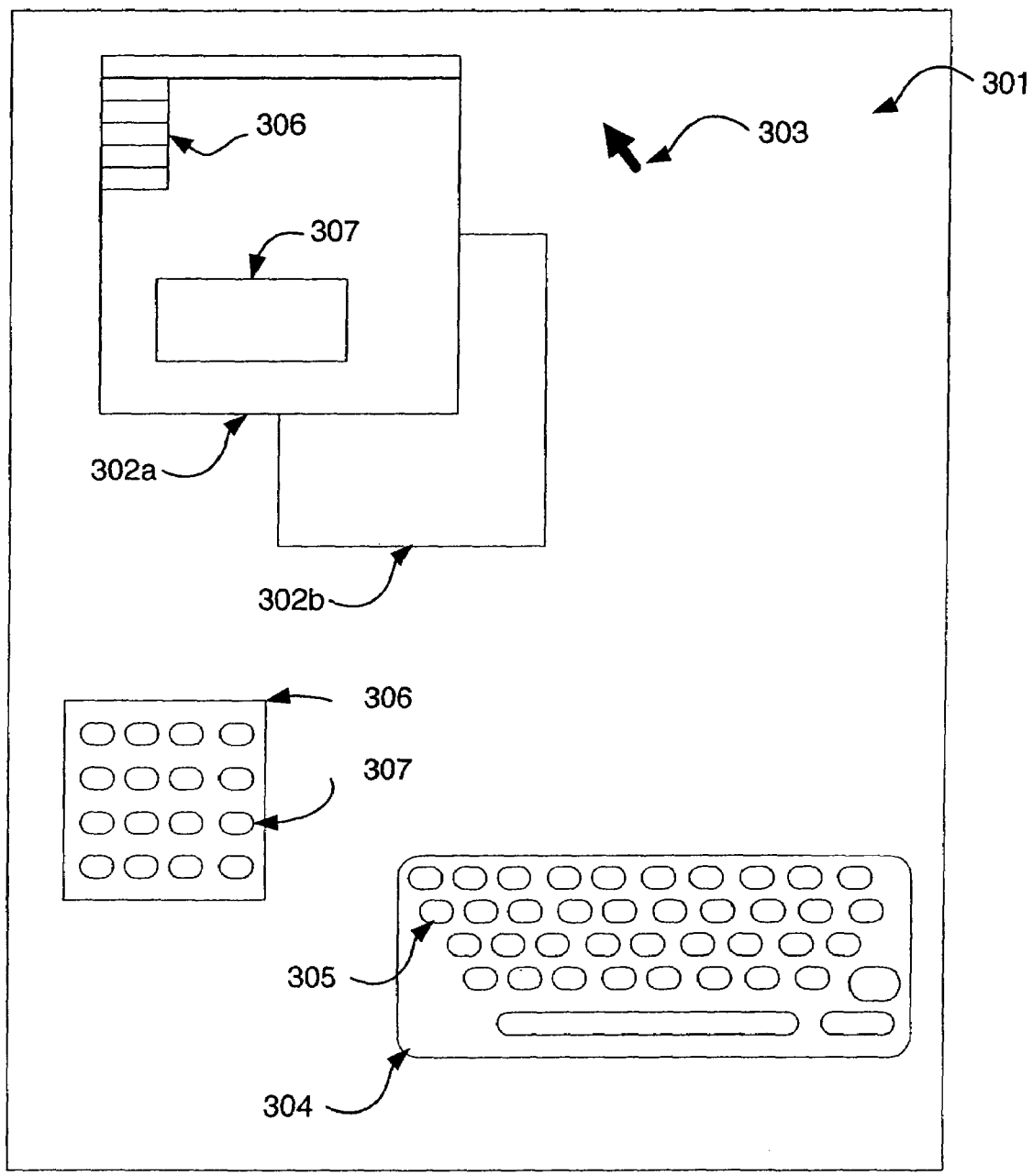
FIG. 3 shows an example of a GUI according to one example embodiment.

FIG. 3 depicts an example computer system GUI according to one embodiment of the present invention. In FIG. 3, the display area 301 includes one or more application panels 302a,b that correspond to one or more applications operating on the computer system. The panels 302a,b may overlap one another, as shown, or they may be positioned to avoid overlap. The display area 301 also includes an onscreen pointer 303, that may be moved around the display area 301 using any conventional method for moving such a pointer (e.g., a mouse, trackball, joystick, etc.). Additionally, display 301 may appear on a device that is sensitive to a stylus (such as stylus 204), and pointer 303 may be repositioned based on the proximity and/or placement of the stylus on the display 301.

An input panel 304 may also be displayed on the display area 301. The input panel 304 may include one or more keys 305 to be used to enter data. In some embodiments, the keys 305 correspond to keys found on a conventional physical keyboard, and can be used to enter text by positioning the pointer 303 and/or stylus over the keys 305, and entering a selection input on one or more of the keys. However, the keys 305 may be any desired keys and/or any combination or subcombination of the keys normally found on a conventional physical keyboard. For example, in some embodiments, the keys 305 may include one or more "quick keys" that correspond to keyboard keys that are used more often than others. By placing such common keys in the readily-accessible input panel, overall throughput may be improved. Furthermore, some embodiments may remove certain keys 305 from the input panel if they are not used often. By removing such keys, the overall size of the input panel 304 may be reduced, allowing improved use of the available space on the display. In some embodiments, these quick keys may be arranged in a distinct area of input panel 304 in order of their frequency of use.

In some embodiments, the input panel 304 may also be accompanied by a separate input area 306 that may be called up as needed. For example, separate input area 306 may contain additional keys 307 corresponding to character symbols that are less frequently used (such as "§", or certain characters in non-english languages). The separate input area 306 may remain hidden until needed, and may be called up using any known form of input (e.g., pressing a particular key 305, tapping the stylus in a predetermined manner, selecting it from a menu, etc.). Use of such separate input areas provides flexibility to the user. In some embodiments, the separate input area 306 may behave as a separate panel from input panel 304, and may be repositioned on the display area separately. In some embodiments, the separate input area 306 may initially appear as part of the input panel 304, and may be "torn away" upon request by the user. For example, the user might wish to reposition the separate input area 306 to be closer to a particular area of the display area, but may wish to leave the remainder of the input panel 304 at a different location. By entering a predefined command, such as clicking and dragging a portion of the input panel 304, the user may cause the separate input area 306 to be displayed and/or repositioned at a different location.

The selection input may be a depression of a button on the stylus, a touch of the stylus to the screen, a depression of a button on a keyboard, a depression of a button on the computer system itself (e.g., on its housing), a depression of a button on a mouse, and/or in any known method for selection using a GUI pointer. The keys 305 may include textual keys (e.g., "A," "a," "B," "b," "1," "2," "$," etc.) and/or functional keys such as SHIFT, CTRL, ESC, UP ARROW, PAGE DOWN, ENTER, etc.

Input panel 304 may be used as a keyboard substitute to enter data (e.g., textual data) into the various application panels 302a,b. In the FIG. 3 example, the user may use a stylus and select (or "press") a series of onscreen keys 305 to enter textual data, such as "testing, 123," and the textual data corresponding to those key selections would be transmitted to the application that had the input focus. In the FIG. 3 example, the application corresponding to panel 302a appears on top of the z-order, and this panel has the input focus.

It should be noted that in this example, panel 302a retains the input focus, even after the user has selected keys 305 appearing in input panel 304. Additionally, any transient UI elements, such as a pull-down menu 306 or a pop-up window 307, that were displayed on the panel 302a prior to the user selection of keys 305 would remain displayed so that the user could continue to interact with the transient UI element (e.g., to select from the pull-down menu 306). In other words, as desired, the display of the transient UI element would not be affected by user selection of the keys 305, and the transient UI element may remain onscreen, for example, one or more seconds after the user selected one or more of the keys 305. Indeed, the entered textual data would, in some embodiments, be transmitted to the panel 302a as if the user had typed the keystrokes on a keyboard while the input focus remained with the panel 302a. For example, if a menu option could have been selected from menu 306 with the text string "testing, 123," then that option would be selected in some embodiments upon the user entering that data in the input panel 304.

To allow the input panel 304 to more easily serve as a keyboard substitute, in some embodiments of the present invention, the input panel 304 is displayed at the top of the z-order of application panels 302a,b, allowing the input panel 304 to always remain visible. The input panel 304 need not, however, be the absolute highest ranking panel in the z-order. For example, the input panel 304 may, in some embodiment, be given a z-order ranking below that of the application panel 302a having the input focus. In such embodiments, the user would be able to view the entire panel of the application he/she is currently using. In other embodiments, the input panel 304 may be given a priority that is higher than most applications, but is still below some UI elements that are used for the underlying computer system. For example, in the MICROSOFT WINDOWS™ environment, the input panel 304 might be given a priority that is higher than all "normal" applications (e.g., word processors, email programs, graphic editors, etc. commonly used by the user), but below "system level" applications and/or UI elements associated with the underlying computer system, such as the WINDOWS™ task bar, a UI element relating to the operation of the underlying WINDOWS™ operating system. Placing such system level applications and/or UI elements above the input panel 304 and all "normal" applications helps ensure that the system-level elements are always accessible to the user.

Although the z-order may help determine the manner in which overlapping panels are depicted, the highest ranking panel in the z-order is not necessarily the one having the input focus. Accordingly, it is possible for a particular panel to be displayed above other applications, and yet still not have the input focus. This may be helpful, for example, where the user wishes to view information depicted in a panel, but does not require the ability to edit or interact with that panel (e.g., a map legend may have a higher rank in the z-order than its corresponding map, but the user might not need to edit the legend, and may wish instead to have the input focus remain with the map).

In some embodiments of the present invention, the input panel 304 may be configured to never be given the input focus of the system, even if it is the highest ranking panel in the z-order. Denying input focus to the input panel 304 may be most beneficial in embodiments where the input panel 304 is determined to be simply an input device, such as a keyboard, intended for supplying data to other applications. In such situations, denying input focus may simplify actions where, for example, the user inadvertently clicks a mouse on a location between keys 305 on input area 304.

Figure 4:
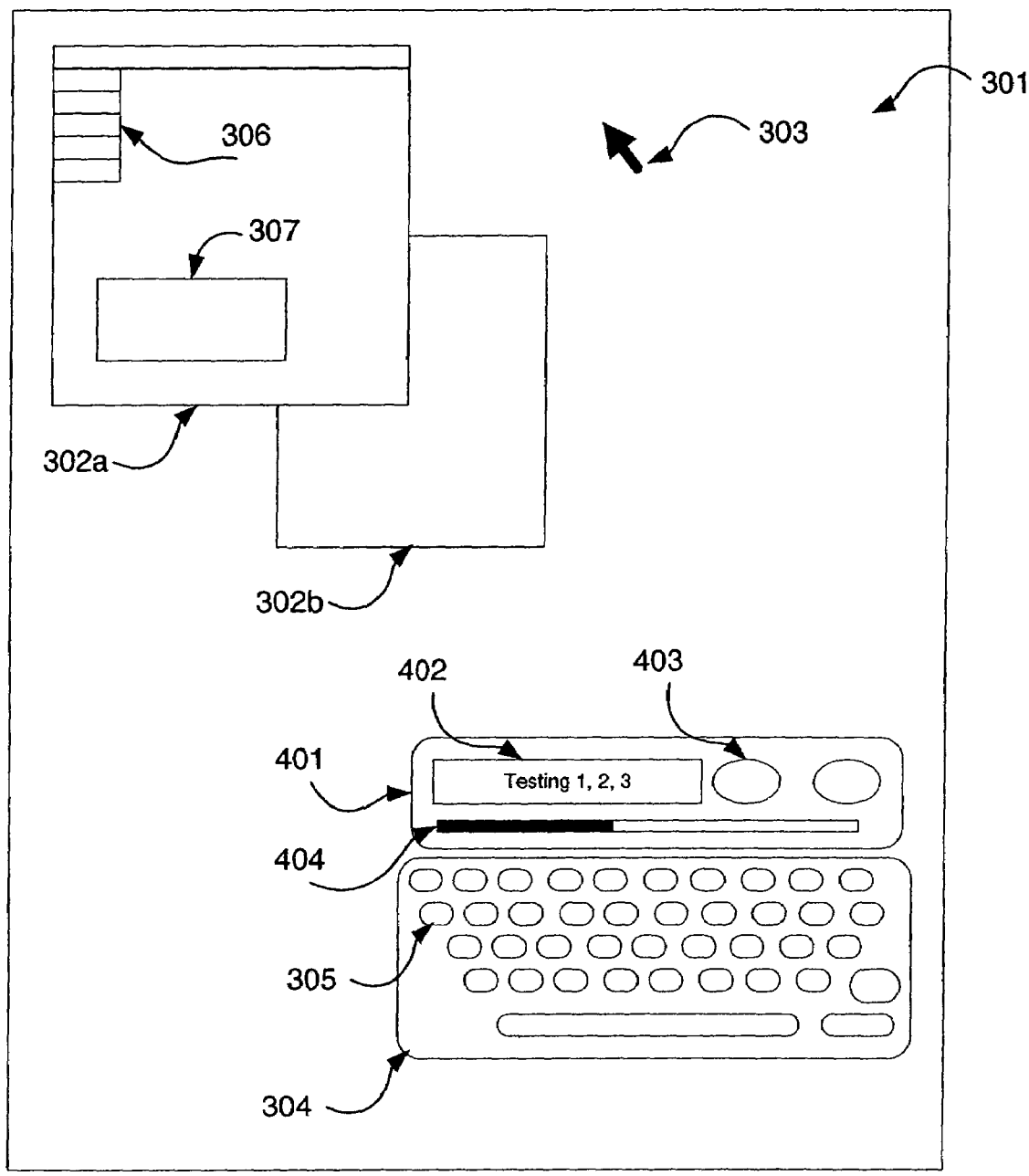
FIG. 4 shows an example of a GUI according to an alternative example embodiment.

FIG. 4 depicts another example embodiment, in which a preview panel 401 is added to the GUI elements shown in FIG. 3. The preview panel 401 may include a preview area 402, and one or more additional keys 403. The preview area 402 may display data, such as text data, that is entered by the user using the input panel 304, but before the data is forwarded to the application panel 302a having the input focus. The preview area 402 may allow users to identify any errors that may have occurred (e.g., touching the wrong key 305, inadvertently selecting a key 305 twice, etc.) as they entered data in the input panel 304. If the data displayed in the preview area 402 is accurate, then the user may have that data forwarded to the application panel 302a having the input focus. This forwarding may be initiated by pressing a key 403, pressing a different button, or by any other form of user input.

If there are errors in the data displayed in the preview area 402, the user may select the preview area 402 and/or preview panel 401 to temporarily give it the input focus, and the displayed data may be edited as with any text editor. This editing may be accomplished using additional key presses on input panel 304, key presses on a keyboard, stylus, or housing of the computer system, and/or any other method of editing electronic text and/or other data.

If preview panel 401 or preview area 402 is temporarily given the input focus for this correction, the computer system may note the application panel 302a that previously had the input focus. When the user is finished editing the data in the preview area 402, the data may then be forwarded to the application panel 302a that previously had the input focus. Granting the preview panel 401 and/or preview area 402 this temporary input focus allows further inputs, such as those from a hardware keyboard, to be forwarded to the preview panel/area 401/402 to simplify the correction process.

As an additional feature, the preview panel 401 and area 402 may be used to display data entered by other input applications and/or devices. For example, the preview area 402 may be used to display spoken text that is detected by a speech recognition program operating on the computer system. In this manner, the user is given the opportunity to review and/or edit the text, prior to forwarding it to the desired application. The preview panel 401 may also include a speech recognition progress meter 404, to provide the user with feedback regarding the amount of detected sound that has been processed by the speech recognition application.

The input panel 305 and/or preview panel 401 may also include graphical objects, such as buttons 403, that are used by the speech recognition program. For example, the preview panel 401 may include a button that is used to switch the speech recognition program between so-called "command" and "dictation" modes. In a "command" mode, the speech recognition application may interpret spoken words and phrases as commands, such as a command to open an application file, open a menu, make a menu selection, etc. Alternatively, in a "dictation" mode, the speech recognition application may interpret spoke words and phrases as spoken text. When used with a speech recognition program, the input panel and/or preview panel 401 may include graphical buttons 403 that are used to control the speech recognition program itself, such as switching between modes, turning on/off the microphone, etc. When received at the preview panel 401, an input on such graphical objects might be processed by the speech recognition program, but not the underlying desired application. As will be discussed below, this may be accomplished by "consuming" the user input so that, in some embodiments, the desired application (e.g., application having panel 302a) does not receive the input at all.

Furthermore, the preview area 402 is not limited to the display of entered textual data, but may also be used to display entered graphic data, before forwarding such data to the intended application(s).

In some embodiments, the preview panel 401 and/or area 402 may be associated or linked with the input panel 304, such that actions affecting one may also affect the other. For example, since the input panel 304 may be displayed as a panel, it may be moved and/or resized. The preview panel 401 and/or area 402 may be configured to move and/or resize in accordance with, and responsive to, the moving and/or resizing of the input panel. The reverse may also be true, where moving and/or resizing of the preview panel 401 and/or area 402 may have a corresponding effect on the input panel 304.

IV. Example Applications and Processes

The various embodiments discussed above may be implemented on any number of computer systems, including, among others, MICROSOFT WINDOWS™ computer systems and environments. The following discussion of the methods for implementing the various features and embodiments discussed above uses the MICROSOFT WINDOWS™ environment as an example, and it should be understood that similar methods may be implemented in other computer systems as well.

Figure 5:
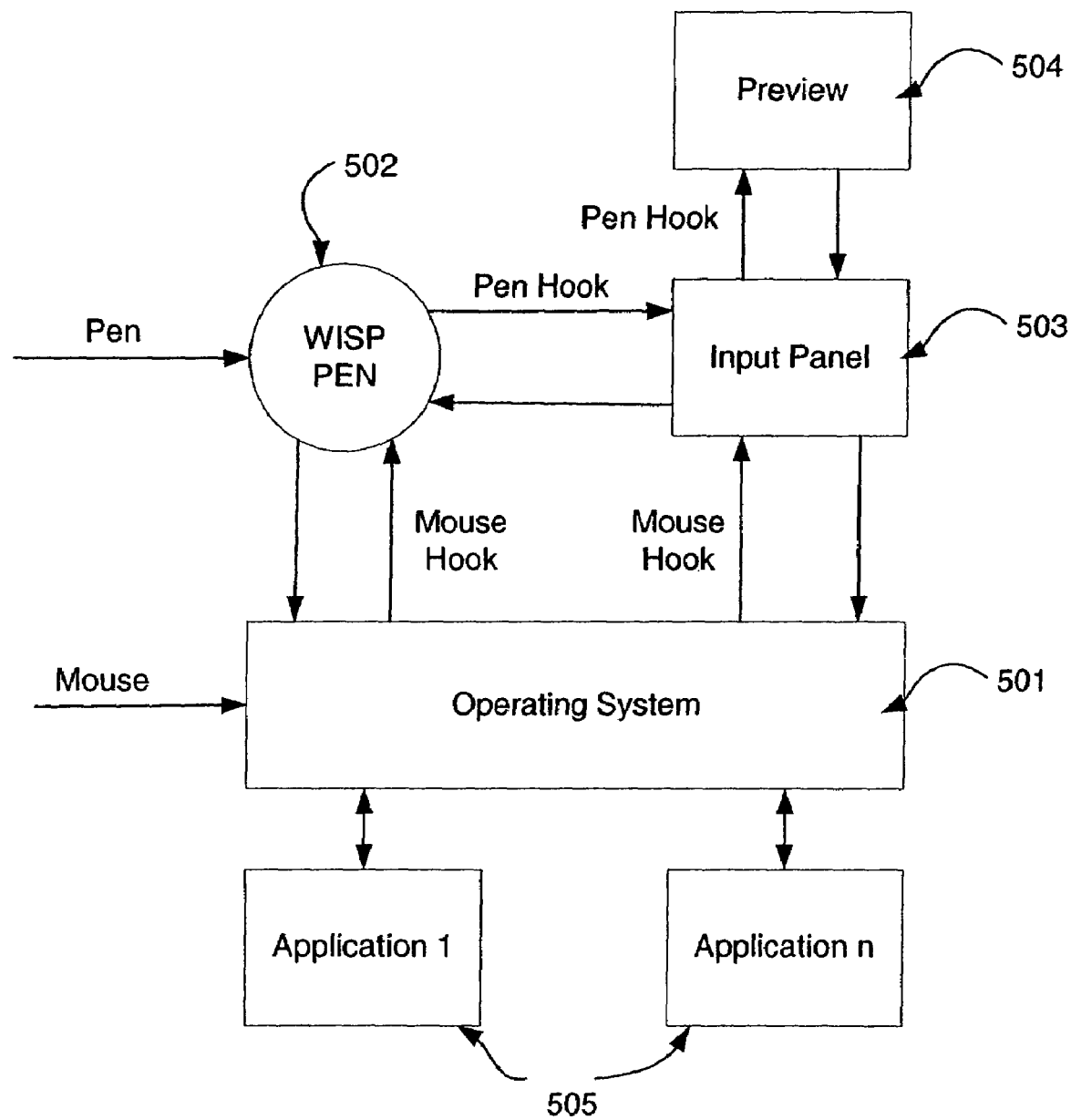
FIG. 5 shows logical relationships between applications and processes according to one example embodiment of the present invention.

FIG. 5 depicts a logical diagram of various applications and/or processes that may be found in a computer system according to an example embodiment of the present invention. At the outset, the computer system includes an operating system 501 that may be, for example, the WINDOWS™ operating system. In the WINDOWS™ system, this underlying operating system is referred to as "User32," and is responsible for, among other features, the managing of user inputs within the computer system.

Operating in conjunction with the operating system 501 is an application 502 that handles the detection and interpretation of inputs from a users stylus, or pen. In one example embodiment in the WINDOWS™ system, this is performed by the Windows Ink Services Platform, (a.k.a. WISP or WISP PEN), which includes a series of application programming interface (API) functions that can be used by applications in the computer system.

Additional applications and/or processes may be implemented as well. The input area application 503 handles the various steps, functions and features regarding the input panel 304 discussed above, while the preview area application 504 handles the same for the preview panel 401, preview area 402, and preview panel buttons 403 discussed above. Other applications 505 may also operate in connection with the operating system. For example, one or more of applications 505 may be responsible for interpreting user inputs from various devices, such as the system keyboard, mouse, and/or other pointing device. These user input applications may operate in conjunction with the WISP PEN application 502.

To implement an example embodiment, the WISP functionality may automatically be initiated upon bootup of the operating system. The input area application 503 may be initiated by the user's request, or it may be automatically created by the operating system 501. In some embodiments, the input area application 503 may be automatically initiated upon booting up of the operating system 501. Alternatively, the input area application 503 may be initiated when the user starts another application, such as a word processing application, that uses the input area 503.

The input panel 304 corresponding to the input area application 503 may be assigned a predetermined ranking in the z-order. In one example, this may be accomplished by first calling the WINDOWS™ WS_EX-TOPMOST function, and subsequently using the FindWindow and SetWindowPos to define a position in the z-order that is beneath the WINDOWS™ Taskbar, but above other applications. In some embodiments, when the application having the input focus is run in full screen mode, the Taskbar may become invisible, and as such, the input area 304 may simply be assigned to the very top of the z-order.

The individual elements in the input panel 304, such as keys 305, may be implemented individually as separate ActiveX controls, and may register themselves with WISP 502 to establish themselves as "pre-hooks" to capture user input events, such as pen down events stemming from the display surface detecting the user's pen or stylus. By registering themselves as "pre-hooks," the individual elements receive notification of the user input events before other applications.

In some embodiments, the input panel 304 may be configured to never take the input focus of the system. This may be accomplished, in one example, by using the WS_EX_NOACTIVATE WINDOWS™ function call.

The preview panel/area application 504 may be initiated when the input area application 503 is initiated. Alternatively, the preview panel/area application 504 may be initiated at some time after the input area application 503, for example, after the user enters data using the input panel 304, or upon specific request by the user. In some embodiments, the input panel 304 and preview panel/area 401/402 are implemented as separate applications, and may be separate Component Object Model (COM) objects that have references to one another. By implementing them as separate applications, it is possible to deny input focus from the input panel 304, and yet still allow input focus to the preview panel/area 401/402 for the temporary instances in which the user wishes to edit the displayed data before forwarding it to the designated application. Furthermore, having these objects reference one another allows a linking between them, allowing them both to respond to a move and/or resizing command that is made to one of them.

In some embodiments, the input panel 304 and/or preview panel 401 may be moved using a set of function calls separate and distinct from panel movement functions offered in the underlying operating system 501. In such embodiments, the original position of the pointer is recorded, as is the relative position of the pointer as it is moved by the user. The input panel 304 and/or preview panel 401 may simply be rendered in its new position when movement is complete, or may be rendered in a new position periodically (e.g., 15, 25, 30, 45, 60, etc. times per second). In one example embodiment, the rendering occurs 30 times per second to give the appearance of a smooth movement. This may be particularly beneficial when the underlying operating system would automatically give the input focus to a panel that is being resized and/or moved, and the input panel 304 is configured to not accept any input focus.

V. Process of Receiving and Managing User Inputs

When the various applications and panels have been established, use of the input panel 304 will be described herein using the following general types of example inputs: 1) pen/stylus inputs; and 2) mouse/pointer inputs, and the flow diagram shown in FIGS. 6a and 6b.

Figure 6A:
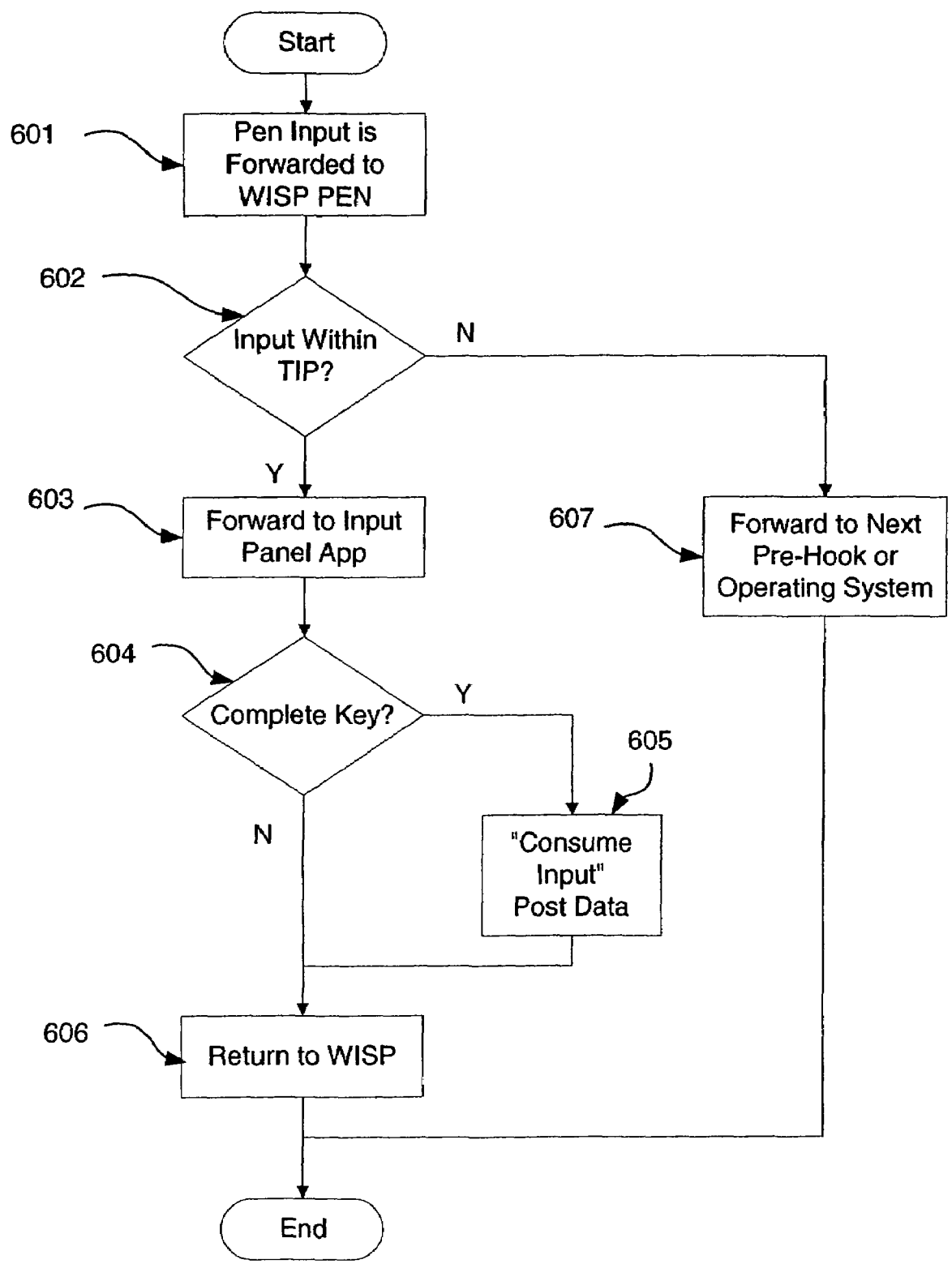
FIGS. 6*a*-*b* depict example flow diagrams for processes in an example embodiment of the present invention.

As shown in FIG. 6a, upon receiving a pen (or stylus) input, the location and type of the input may be forwarded to the WISP application 502 in step 601. Then, in step 602, the WISP application 502 determines whether the location of the input is within the boundaries of the input panel 304. If the pen input is within the boundaries of the input panel 304, then the input is forwarded in step 603 to the input panel application 503 for processing. The boundaries of input panel 304 may be any area assigned to the panel, such as the area of the display occupied by the panel.

In step 604, the input panel application 503 determines whether the input is of a proper location and type to complete a user's selection of a key 305. To determine the location of the input, the input panel application 503 may check the location with the boundaries of the various keys 305. To determine the type of the input, the input panel application 503 may compare the input type (e.g., pen down, pen up, pen hold, etc.) with the type required for activation of the particular key 305.

If the input is of a type that completes the selection of a particular key 305, then the input panel application 503 may take the appropriate action in step 605. The appropriate action may include sending a response to the WISP 502, indicating that the particular pen input is to be "consumed," and that it is not to be forwarded to other applications. By "consuming" the input, the input panel application 503 is able to prevent other applications from responding to the input, which can, among other features, prevent those other applications from closing transient UI elements. The appropriate action in step 605 may also include forwarding (or posting) the data (e.g., the letter of the key 305 that was selected) to the appropriate application. The application may be a word processing application that currently has the input focus, which would then respond as if the user pressed the corresponding button on a hardware keyboard.

In some embodiments, if the preview panel 401 and/or area 402 are used, this data may first be sent to the preview area 402 for display. In this case, the data would be displayed on the preview area 402, and after confirmation by the user (e.g., the user presses an "Accept" button 403 on the preview panel 401), it would be forwarded or posted to the application that had the input focus.

If, in step 604, the user input does not correspond to the selection of a particular key, then the input is not used by the input panel application 503, and a message is returned to the WISP to this effect in step 606. The WISP may then take whatever further action is desired for such an unused input in the input panel 304. In some embodiments, this input is simply discarded. Other embodiments may forward the input on to other applications. In some embodiments, the pen input is not discarded until the WISP 502 and input panel application 503 both decide it should be discarded. This allows the WISP 502 to take further action based on the pen input (even if the input panel 503 believes the input should be consumed).

If, in step 602, the WISP 502 determines that the pen input is not within the boundaries of the input panel 304, then the pen input is passed on, in step 607 to the next registered "pre-hook," or if there are no more pre-hooks, then the input is forwarded to the operating system for further distribution according to the operating system's own protocol.

Figure 6B:
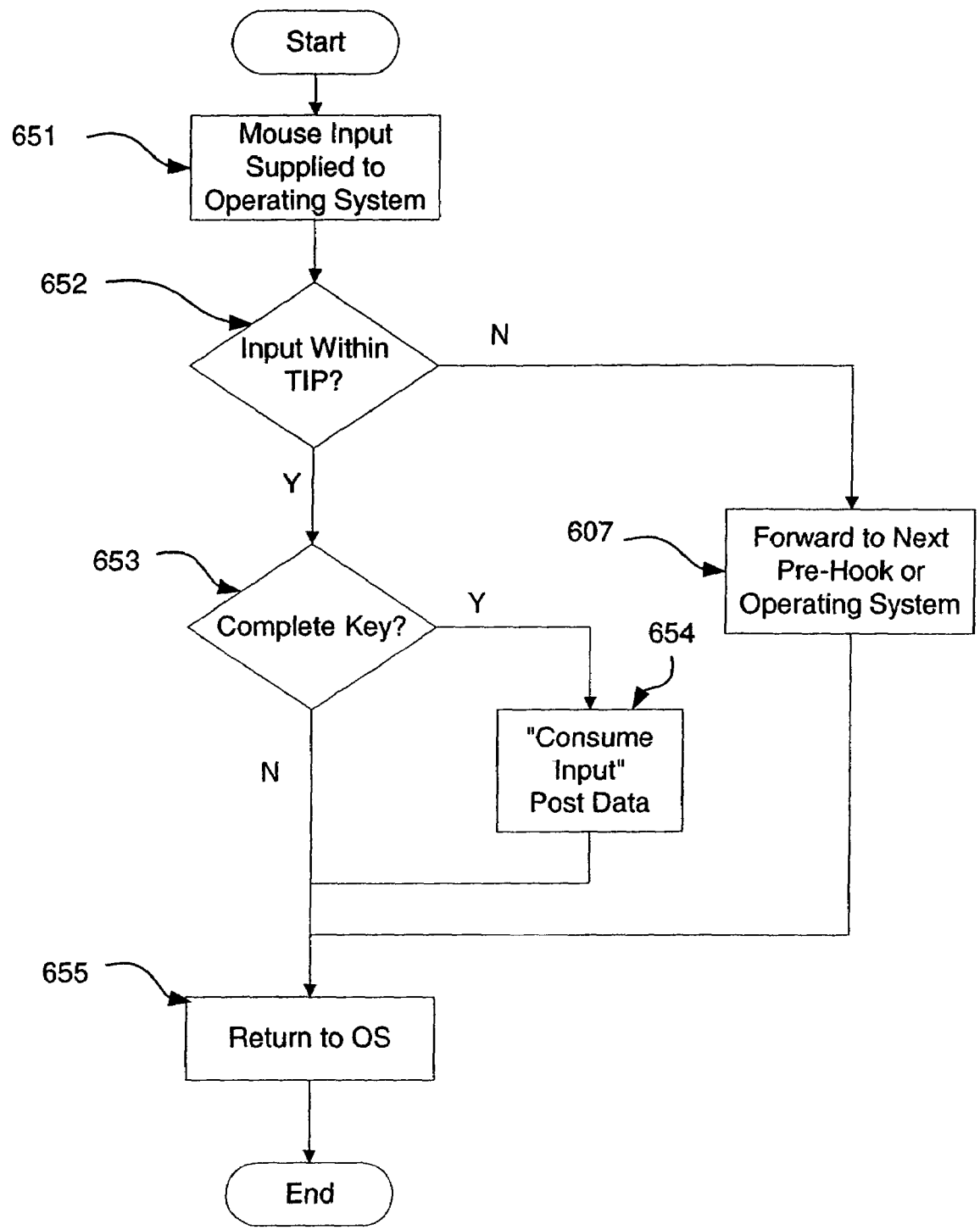
Figure 7A:
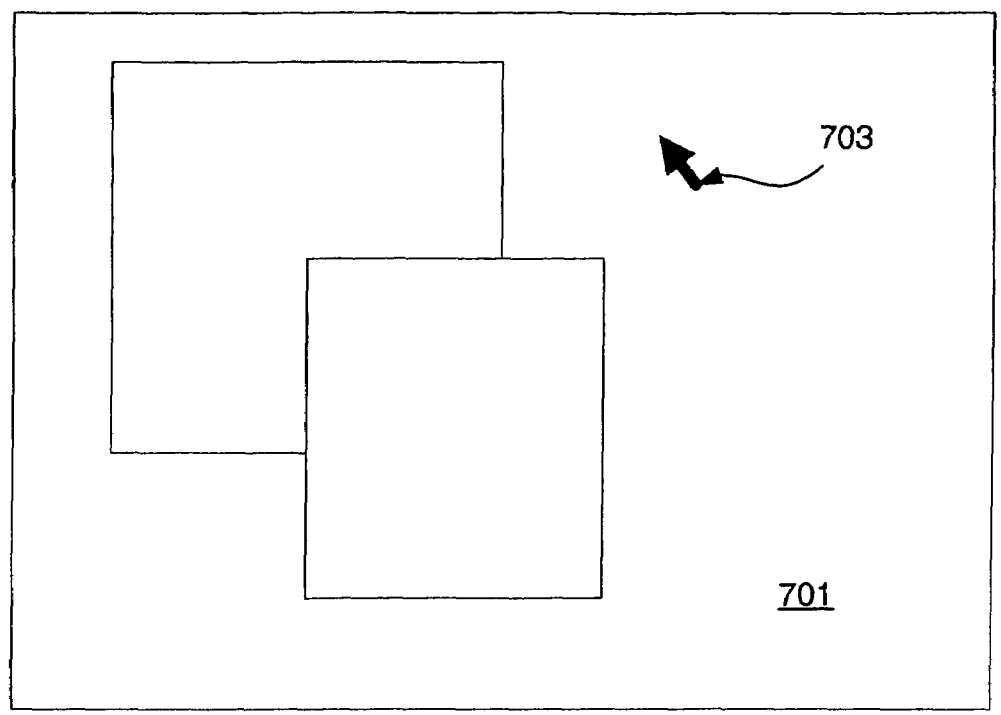
FIGS. 7*a*-*c* depict screen elements known in the prior art.
Figure 7B:
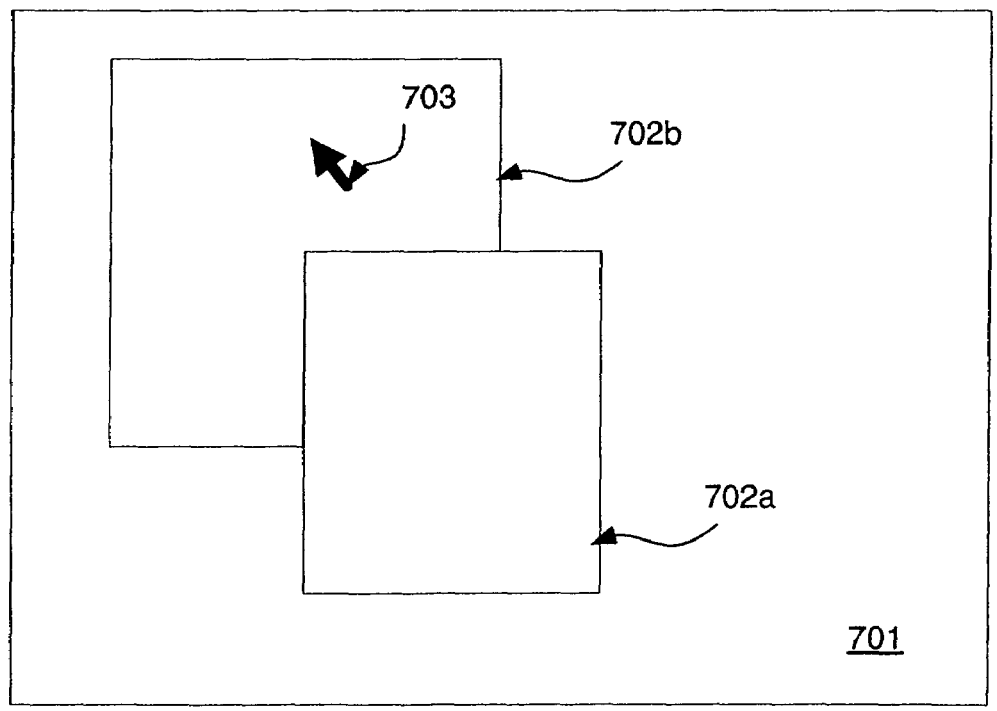
Figure 7C:
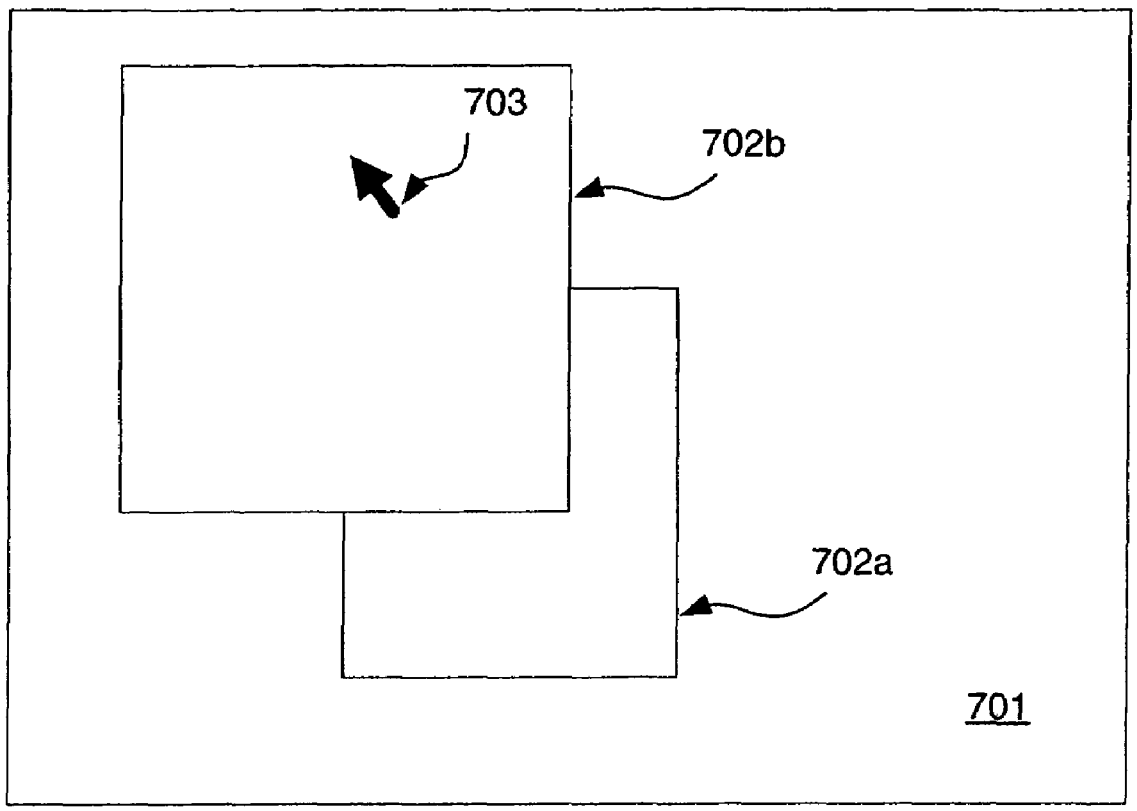

FIG. 6b illustrates a similar process that may be taken for inputs using the traditional onscreen pointer and pointer device, such as trackballs, mouse, joystick, etc. (collectively, "mouse" inputs). In step 651, the mouse input is first supplied to the underlying operating system (e.g., "User32" in the WINDOWS™ system) when it is received. This occurs in the example embodiment because the existing WINDOWS™ system was designed to use such a mouse input, and there are already significant operating system function calls in place to manage inputs from a mouse. In alternative embodiments, the WISP functionality described above for pen inputs may be revised to incorporate the mouse input functionality described herein as part of the underlying operating system.

In step 652, the mouse input is provided to the input panel application 503, which determines whether the input is within the boundaries of the input panel 304. In alternative embodiments, the mouse hook may first be sent to the WISP 502 (or a similar application), which can make the boundary determination.

To help ensure that the input panel 304 gets the first opportunity at reviewing the mouse input, the input panel 304 (or the individual keys 305) may register for priority Low Level Mouse Hooks. In the exemplary operating system, mouse input events are distributed to applications having registered hooks before they are distributed to other applications.

If the input is within the boundaries of the input panel in step 652, the input panel application 503 (or the individual key 305 ActiveX controls) determines, in step 653, whether the received mouse input completes a user selection of a particular key 305.

If the mouse input completes such a user selection of a key, then in step 654, the input panel application indicates that the mouse input should be consumed, and the data corresponding to the selected key (e.g., the selected character) is forwarded, or posted, to the application having the input focus. In some embodiments, this may be the designated application, such as a word processing program, that ultimately needs the inputted data. In alternate embodiments, the preview application 504 may first receive the data to display in a preview panel 402, before forwarding the data on to the designated application. As discussed above with respect to pen inputs, this may occur after the user has selected or pressed the "Accept" button 403 in the preview application.

If, in step 653, the mouse input does not complete the selection of a key 305, then the mouse input may be returned to the operating system in step 655. The operating system may, in turn, forward the mouse event on to other registered applications. In some embodiments, these other registered applications may include the WISP 502, which may determine that the mouse input should be consumed. This may occur when the input is within the boundary of the input panel 304 (as determined by the WISP 502 and/or input panel application 503). If both the WISP 502 and input panel application 503 request that the mouse input be consumed, then the operating system 501 will simply discard the input, and will not forward it to other applications. In this manner, the designated application having the input focus will not "know" that the mouse event ever occurred, and as such, will not take certain actions (such as closing transient UI elements) that it otherwise would have taken.

If, in step 652, it is determined that the input is not within the boundaries of the input panel, then the mouse event may simply be returned to the operating system in step 655 for further processing as described above.

VI. CONCLUSION

Various embodiments and aspects of the present invention have been described above, and it will be understood by those of ordinary skill that the present invention includes within its scope all combinations and subcombinations of these embodiments and aspects. The full scope of the present invention should only be limited by the claims, which read as follows:

The claimed invention is:

1. A method of managing user inputs in a computer system having a display, to create a framework supportng a plurality of applications comprising the steps of:

displaying an application panel on said display, said application panel corresponding to a first application operating on said computer system through a connection to an individualized component object model, and said first application having an input focus of said computer system;

displaying an application panel corresponding to a second application, different from said first application, operating on said computer system through a connection to an individualized component object model being different from the component object model for the first application;

displaying an input panel on said display while said application panel corresponding to a first application is displayed, said input panel corresponding to an input application of said computer system;

receiving a first user input in said input panel, said first user input corresponding to entry of data, a command, or selection by said user to said computer system;

determining whether said first user input is to be consumed by said input panel corresponding to said first application; and forwarding data corresponding to said user input to said first application if said user input is not to be consumed by said input panel, including:

retaining said input focus by said first application after said first user input is received if said first user input is not to be consumed by said input panel, and said first application retains said input focus of said computer system after said first user input is received if said first user input is to be consumed by said input panel.

2. The method of claim 1, wherein said application panel displays a transient user interface element before said first user input is received, and said transient user element remains displayed after said first user input is received; and passing said input focus from said first application to said second application that is different from said first application, when said first application references said second application through said framework supporting a plurality of applications.

3. The method of claim 2, wherein said transient user element is a menu, and said first user input results in the selection of an item in said menu.

4. The method of claim 1, wherein said input panel contains a plurality of onscreen keys, said keys being selectable by a user input device.

5. The method of claim 4, wherein said user input device is a stylus, and said display is configured to detect said stylus.

6. The method of claim 1, further comprising the step of determining whether said user input is within a boundary of a displayed graphical object in said user input panel.

7. The method of claim 6, wherein said displayed graphical object corresponds to textual data, and said textual data is forwarded in said step of forwarding.

8. The method of claim 1, wherein said application panel is a word processing program.

9. The method of claim 1, wherein said application panel is a preview panel, and said preview panel displays said data corresponding to said application.

10. The method of claim 1, wherein said input panel includes one or more keys corresponding to keyboard keys, wherein said one or more keys are arranged in accordance with the frequency with which they are used.

11. The method of claim 1, further comprising the steps of:

receiving a second user input, said second user input requesting that a portion of said input panel be repositioned; and repositioning said portion of said input panel responsive to said second user input.

12. A computing device, comprising:

a stylus user input device;

a display configured to detect said stylus; and a memory containing computer-executable instructions, said instructions causing said computing device to perform the following steps to create a framework supporting a plurality of applications comprising:

display a first application panel corresponding to a first application, said first application having an input focus of said computing device through a connection to an individualized component object model;

display an application panel corresponding to a second application, different from the first application, operating through the connection to an individualized component object model being different from the component object model for the first application;

display a user input panel corresponding to a user input application while said first application panel is displayed, said user input panel including a plurality of onscreen keys corresponding to textual characters; and receive a user input on said display, said user input being located within said user input panel, wherein said first application panel retains said input focus after said user input is received, and said user input application determines that said user input should not be distributed to said first application.

13. The device of claim 12, said computer-executable instructions further causing said user input application to transmit textual data corresponding to said user input to said first application.

14. The device of claim 13, wherein said first application is a preview application, and said first application panel displays said textual data.

15. The device of claim 14, wherein said computer-executable instructions further cause said first application panel to resize when said user input panel resizes.

16. The device of claim 14, wherein said computer-executable instructions further cause said first application panel to relocate responsive to a relocation of said user input panel.

17. A computing method to create a framework supporting a plurality of applications, comprising the steps of:

displaying a user input panel, said user input panel including a plurality of onscreen keys corresponding to a plurality of textual characters;

displaying a first application panel, said first application panel having a computer system input focus through a connection to an individualized component object model;

displaying an application panel corresponding to a second application different from the first application, operating though the connection to an individualized component object model being different from the component object model for the first application;

receiving data entered using one or more of said plurality of onscreen keys;

displaying a preview panel, said preview panel displaying data corresponding to said data entered using said one or more of said plurality of onscreen keys, and wherein said preview panel moves corresponding to movement of said user input panel; and receiving a request to forward said data displayed on said preview panel to said second application panel, wherein said first application panel retains said input focus while said data is entered in said input panel using said one or more of said plurality of onscreen keys.

18. The method of claim 17, further comprising the step of displaying a transient user interface element on said application panel before said data is entered using said one or more of said plurality of onscreen keys, wherein said transient user interface element remains displayed after said data is entered.

19. The method of claim 17, Thither comprising the step of determining whether a user input to said user input panel should be consumed by said user input panel.

* * * * *